(12) United States Patent
Lowrey, III (10) Patent No.: US 9,151,574 B2
(45) Date of Patent: Oct. 6, 2015

(54) METHOD OF MOVEMENT COMPENSATION FOR A WEAPON

(71) Applicant: John William Lowrey, III, Mansfield, LA (US)

(72) Inventor: John William Lowrey, III, Mansfield, LA (US)

( * ) Notice: Subject to any disclaimer, the term of this patent is extended or adjusted under 35 U.S.C. 154(b) by 0 days.

(21) Appl. No.: 13/944,394

(22) Filed: Jul. 17, 2013

(65) Prior Publication Data

US 2013/0298438 A1 Nov. 14, 2013

Related U.S. Application Data

(63) Continuation of application No. 13/246,630, filed on Sep. 27, 2011, now abandoned.

(51) Int. Cl.
| | |
|---|---|
| *F41G 1/00* | (2006.01) |
| *F41G 11/00* | (2006.01) |
| *F41C 27/22* | (2006.01) |
| *F41G 1/38* | (2006.01) |
| *F41G 3/06* | (2006.01) |
| *F41G 3/08* | (2006.01) |
| *G02B 23/14* | (2006.01) |
| *G02B 27/64* | (2006.01) |
| *F41G 3/12* | (2006.01) |

(52) U.S. Cl.
CPC ............... *F41G 11/00* (2013.01); *F41C 27/22* (2013.01); *F41G 1/38* (2013.01); *F41G 3/06* (2013.01); *F41G 3/08* (2013.01); *F41G 3/12* (2013.01); *G02B 23/14* (2013.01); *G02B 27/646* (2013.01)

(58) Field of Classification Search
CPC ............... F41G 3/08; F41G 3/06; F41G 3/00; F41G 1/38
USPC ............................ 42/119, 123, 135; 89/41.17
See application file for complete search history.

(56) References Cited

U.S. PATENT DOCUMENTS

| | | | | |
|---|---|---|---|---|
| 3,659,494 | A * | 5/1972 | Philbrick et al. ............. | 89/28.05 |
| 5,026,158 | A * | 6/1991 | Golubic ........................ | 356/252 |
| 6,247,259 | B1 * | 6/2001 | Tsadka et al. ................. | 42/114 |
| 2005/0268521 | A1 * | 12/2005 | Cox et al. ........................ | 42/130 |

* cited by examiner

*Primary Examiner* — J. Woodrow Eldred
(74) *Attorney, Agent, or Firm* — Warner J. DaLaune; Baker Donelson, et al.

(57) ABSTRACT

A method for stabilizing an image and compensating for movement of a weapon is provided, comprising: providing an image stabilization device for an optical scope mounted on a weapon, wherein the image stabilization device includes a sensor to detect motion of the weapon; providing a trigger release device operatively connected to a trigger on the weapon; detecting movement of the weapon by the sensor; generating an output signal from the sensor, wherein the output signal corresponds to the position and velocity of the weapon in a plane perpendicular to the line of sight upon alignment of a feedback reticle with a telescopic sight reticle; processing the output signal to determine an optimal release period, and then generating a release signal during the release period; and using the release signal to activate the trigger release.

7 Claims, 10 Drawing Sheets

METHOD OF MOVEMENT COMPENSATION FOR A WEAPON

CROSS-REFERENCE TO RELATED APPLICATIONS

This application is a continuation of Ser. No. 13/246,630 filed Sep. 27, 2011, which is a continuation-in-part of Ser. No. 11/076,340 filed Mar. 8, 2005.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

This invention relates to methods for optical stabilization and movement compensation to improve the accuracy of small arms and similar systems.

2. Description of Related Art

A significant limitation of shooting accuracy is presented by unsteadiness of the firearm. Bench-rest competition shooters employ stable platforms for their rifles to remove this source of motion. However, most other shooters must be content with imperfect supports for their firearms. For example, a standing shooter hand-holding a rifle results in a relatively unstable condition, and most shooters place the rifle in contact with a fixed object, such as a tree, bipod, or other stable platform. With accurate rifles capable of accuracies of better than one minute of angle or about one inch per hundred yards, even slight movements of the rifle can lead to inaccuracies far in excess of the capability of the rifle. Even a shift of only 0.01 inch by the muzzle of the rifle can generate a significant inaccuracy in perfect shooting conditions. Moreover, factors such as wind, the shooter's breathing, and heartbeat can generate deviations in aim which will adversely affect the point of impact of the bullet. In a combat or hunting context, the shooter's physiological responses to stress or excitement can significantly worsen the motion associated with holding an imperfectly-supported rifle.

The motion or shake that causes shooting inaccuracy also presents a visual problem. High-powered riflescopes magnify the motion, thus blurring the image. This makes it difficult to detect, acquire, and identify targets. Oftentimes, a shooter might prefer a higher-powered rifle scope for accuracy, except that the shaky image in actual use makes such higher magnification impractical. Additionally, the effect of mirage produced by atmospheric convection currents viewed over large distances can further complicate the aiming process and introduce undesirable inaccuracies.

With respect to difficulties in image clarity and movement, optical stabilization for cameras and binoculars has seen great commercial success. Moving a lens to keep the image stable and centered as the device moves greatly improves these optical devices. These moving lens techniques are very reliable, inexpensive, and lightweight with low power requirements. Such optical stabilization would be helpful to a shooter as he attempts to identify and prepare to shoot at a target. However, when it comes to improving accuracy, there are no viable optical stabilizers for small arms, such as rifles and pistols, because although the image is stable, the lens train and the barrel continue to move. In practice, the shooter quickly identifies his target and centers the target in the stabilized image, but he still has no way of knowing when the barrel is aligned with the target. The barrel continues to move relative to the stabilized image due to unsteadiness in the position due to involuntary factors such as heartbeat, breathing, and muscular activity.

Specifically, a bullet fired at the precise instant that the moving barrel is exactly aligned with the target will always miss the target. Under those conditions, the moving barrel necessarily imparts movement to the bullet that will carry it away from the target. Skilled shooters sometimes acquire a rhythmic pattern with the barrel and pull the trigger at the right moment for the imparted barrel motion to bring the bullet into contact with the target when it arrives. Many hours on the range give them the "feel" for this effort at different ranges, but it is an imprecise solution to barrel movement, reflecting the need to compensate for movement that can never be completely eliminated. Ideally, a barrel movement compensation system, such as that presented herein, could track the position of the barrel relative to the stabilized image, and then release the firing mechanism at a calculated moment for the bullet to contact the target at the end of its flight. The result would be greater accuracy, as well as easier identification and alignment with the target prior to taking the shot.

Many attempts have been made to increase the accuracy of weapons, from small arms to heavy artillery. For weapon systems where optical acuity, bulk, weight, and power consumption do not appear to be concerns, it has been proposed to employ a gyroscopically-stabilized television image as a fire-control sighting system for a weapon on a moving platform to provide a still image. This is described in U.S. Pat. No. 3,659,494 to Philbrick et al. The Philbrick system projects an image of the target on a photodetector, which converts the image into an electronic signal. An electron beam regenerates the image on a phosphor screen that is viewed by the user. The regenerated image is stabilized by a facility that shifts the electron beam based on gyroscopic inputs. While apparently suitable for aiming large weapon systems, it does not appear to be suitable for applications where a high quality image, and small size, low weight, low cost, and simplicity are desired. Moreover, it appears unsuited to adapt to existing rifle scopes.

The Philbrick patent further describes the system applied to a weapon with an electronic trigger system, so that the sighting system itself automatically sends an electronic signal that fires the weapon when the sight is in a neutral or "home" position in which the image is not shifted, unless the user inhibits firing by releasing pressure on a trigger solenoid. Thus, the Philbrick system is further unsuitable for adaptation to convention rifles using mechanical triggers.

The present invention addresses all of the foregoing concerns and difficulties attributable to movement of the firearm. By controlling the release of the firing mechanism instead of firing at the right position, the invention eliminates complex controls required with systems that directly operate the firearm. In other words, the firearm will only fire under the simultaneous occurrence of two conditions: (1) the trigger is pulled, and (2) a release signal is received from the compensation system upon a calculation that the bullet will intersect the target at the end of its time of flight. This method allows the shooter to identify and aim with a stable image of the target using a conventional optical stabilization system, select that target by pulling the trigger, and the system releases the firing mechanism when the motion of the barrel imparts the correct motion to the bullet so that it contacts the target at the end of its time of flight using information from that same optical stabilization system.

Thus, the present invention provides an inexpensive and simple way to overcome the otherwise unavoidable problems due to movement of the shooter and the firearm. Also, the invention resolves issues that have historically kept optical stabilization out of the small arms market.

SUMMARY OF THE INVENTION

A method is provided for stabilizing an image through an optical scope and compensating for movement of a weapon directing a projectile along a line of sight, comprising: providing an image stabilization device for an optical scope mounted on a weapon, wherein the image stabilization device includes a sensor to detect motion of the weapon; providing a trigger release device operatively connected to a trigger on the weapon; detecting movement of the weapon by the sensor; generating an output signal from the sensor, wherein the output signal corresponds to the position and velocity of the weapon in a plane perpendicular to the line of sight; processing the output signal to determine an optimal release period, and then generating a release signal during the release period; and using the release signal to activate the trigger release.

In a preferred embodiment, the release period is determined based upon an accuracy selection predetermined by a user.

In a further embodiment, the method further comprises providing a trigger pull detection device adapted to determine if the trigger has been pulled by a user; and using the release signal to activate the trigger release only if the trigger pull detection device indicates that the trigger has been pulled.

Optionally, the method may further comprise determining the range of a target, and adjusting the optical scope for the determined range and ballistics characteristics of the projectile. Preferably, the optical scope is adjusted electronically by a rangefinder in communication with the image stabilization device.

Also, the method may further comprise determining the degree of wind between the weapon and the target, and adjusting the optical scope for the determined wind and ballistics characteristics of the projectile. Preferably, the optical scope is adjusted for wind electronically and in communication with the image stabilization device.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Optical Stabilization

Prior to describing the movement compensation methods that are the focus of the present invention, it is helpful to understand the basic functions of conventional or existing image stabilization technology. Optical stabilization consists of sensors that detect the left-right and up-down movement of the optical device being stabilized. In other words, motion of the device is detected in a plane perpendicular to the line of sight. In response to the detected motion, the device moves a lens to intercept the light from the image and return it to the center of the lens train. This lens is moved proportionally to the movement it detects in the optical device. Consequently, the movement of the lens is also proportional to the movement of the device. The position of the correcting lens with respect to the stable image is a direct analog of the position of the device with respect to the stable image.

Sampling the position of the lens with respect to the stabilized image is exactly the same as sampling the position of the device with respect to the stabilized image. In the case of a telescopic sight or optical scope on a weapon, when the stable image is on the target, the lens position is the position of the telescope, and consequently, the position of the weapon barrel with respect to the target.

Movement Compensation

Sampling the lens position (information developed in stabilizing the image) at a regular rate (e.g. 1 ms), the speed and direction of the lens is determined. Its future position can be calculated for any time interval. When the lens is centered on the image, the telescope and the barrel are centered on the image (i.e. target). The lens and its movement are an exactly proportional analog of the weapon barrel movement. Calculations of the lens movement will show where it will be at the end of a time interval equal to the Time To Target. For the purposes of this invention, the Time to Target (TTT) is equal to the Time of Flight (TOF) of the ammunition used, plus the Lock Time of the weapon used. The Lock Time is the amount of time required from the release of the trigger until the ignition of the gunpowder propelling the bullet from the barrel. Such calculation of the lens movement also shows where the barrel will be pointing at that time, as well as where the sideways motion of the barrel, at its release, will have carried the bullet.

Release of the trigger (or whatever applicable firing mechanism is involved) when the calculation determines the lens will center at the end of the Time To Target, means that the sideways motion imparted by the barrel to the bullet will carry it to the center of the stabilized image, the "bull's eye" (i.e., the target if the trigger is pulled), when it arrives at the target at the end of its Time To Target.

To designate the target (i.e., in the stabilized image), the trigger is pulled against a restriction. When the calculated future position of the lens will be centered at the end of the designated Time To Target, the firing mechanism is released, and the bullet exits the barrel with imparted motion that carries it to the center of the image.

First, in the following figures, namely FIGS. 1-6, the present invention will be described broadly with respect to generalized rifle, scope, and image stabilization device. Then, the more detailed methods for movement compensation will be described with respect to FIGS. 7-18.

Figure 1:
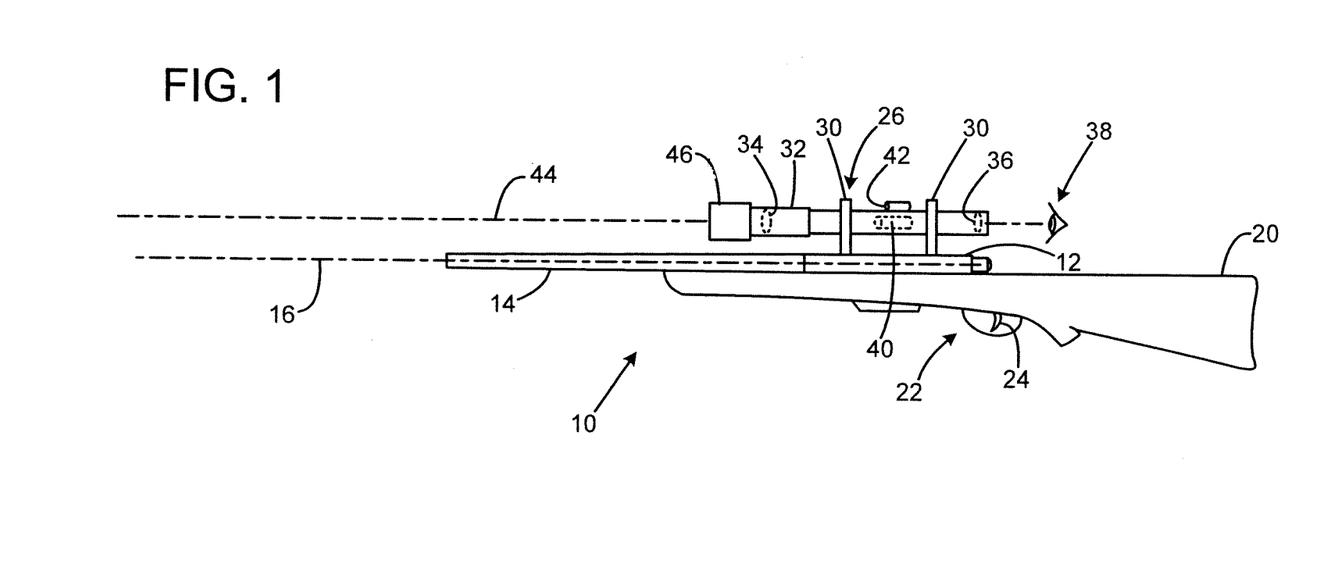
FIG. 1 is a side view of a rifle and mounted scope.

FIG. 1 shows a rifle 10 with a receiver 12 providing a frame, a barrel 14 connected to the receiver and defining a barrel axis 16. A stock 20 is connected to the receiver and partially encompasses a trigger mechanism 22, leaving exposed a trigger lever 24. A telescopic rifle sight or riflescope 26 is secured to the receiver by way of scope mounts 30. The scope has an elongated tubular housing 32 with an enlarged forward portion housing an objective lens 34, and a rear portion housing an eyepiece lens 36. (All lenses are shown in simplified form instead of the preferred multiple element arrangements.) A user 38 views an image of an intended target from the rear of the eyepiece. A prismatic optical element 40 is positioned between the objective and eyepiece lenses, and is shifted vertically and horizontally by adjustment knobs 42 to shift the image to coincide with a bullet's expected point of impact, with adjustments for elevation due to bullet drop based on distance, and for windage due to cross winds. The scope defines an optical axis 44.

Figure 2A:
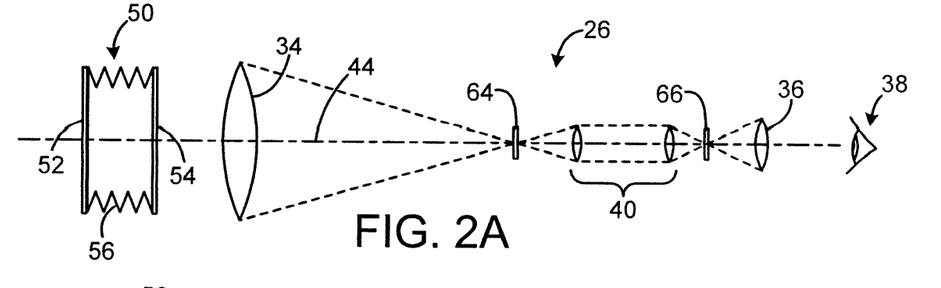
FIGS. 2A, 3A, and 4A are sectional side views of the scope of FIG. 1.

At the front end of the scope, forward of the objective lens 34, is positioned a vibration reduction or image stabilization device 46. As shown in FIG. 2A, the device 46 is in the form of a transparent prism 50 with a flat front surface 52 and flat rear surface 54. A liquid-tight bellows 56 connects the transparent plates that provide the front and rear surfaces, and a transparent index-matched fluid fills the volume defined by the plates and bellows. This enables the front and rear surfaces to be angled with respect to each other by the motivation of actuators (not shown) about the periphery of the plates. The prism may provide any of a range of angular offsets between the plates, with the direction of the offset being in any direction. This provides the capability of providing a device for deflecting or refracting a ray of light by any amount up to a maximum deflection angle, in any direction with respect to the optical axis 44 of the scope 26. FIG. 2A shows the prism in the neutral position in which the plates are parallel to each other and perpendicular to the scope axis 44. Both plates may move as shown, or one may be fixed with the other movable. Any alternative image-shifting system may be employed.

The stabilization device operates in response to angular motion of the rifle to which it is fixed, both in the pitch direction (muzzle up and down) and the yaw direction (muzzle right-left). Gyroscopic, inertial, optical or other angular motion sensors operate in each of the two axes to indicate to device circuitry the angular displacement of the stabilization device. Because the position of the device is fixed in relationship to the barrel, movement of the device is effectively equal to movement of the barrel. In response, the prism instantaneously and continuously adjusts the angle and magnitude of shift to generate a beam deflection equal to the sensed angular displacement, based on conventional optical formulae. Such devices are well known in binoculars and video cameras to provide stable images. Typically, the devices are limited to sensing and correcting for only small, rapid angular movements, and not large, slow and sustained movements. In alternative embodiments, any other type of stabilization system may be employed, as long as it is a transparent system that transmits the image without degradation. A lack of image degradation facilitates accurate target detection and identification. Further, a transparent system keeps the image of the target at a long or essentially infinite distance, unlike stabilization systems that project or generate an image on a screen of the device. Accordingly, conventional rifle scopes that are designed for viewing distant images may be employed with such zero-magnification transparent devices.

Because the angular displacements that are of concern to shooters are extremely small (on the order of minutes of arc), the prismatic deviations needed are very small, so that there is no concern with chromatic aberrations degrading the image. Moreover, the vibrations associated with rifles, and attributable to human movement, are much longer period than those of compact camcorders and binoculars, owing to the relatively substantial weight and moment of inertia of an elongated rifle. Thus, the stabilization system may be tuned to filter out vibrations with a frequency on the order of one second or less; i.e. higher frequency vibrations.

Figure 3A:
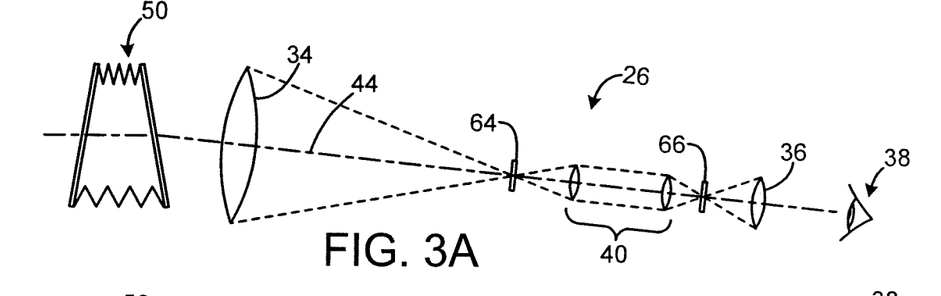
Figure 4A:
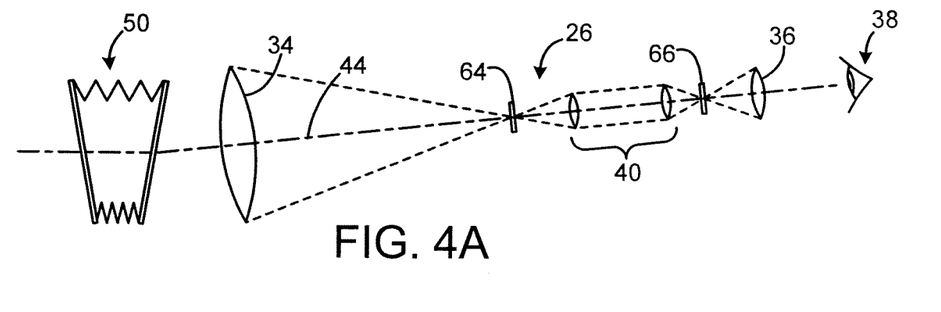
Figure 4B:
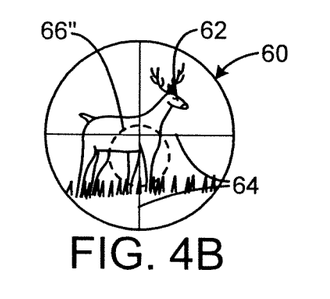

In FIG. 3A, the system is shown in a condition in which the rifle is in an elevated condition with the muzzle momentarily elevated unintentionally due to the unsteadiness of the shooter. In FIG. 4A, the rifle is in a depressed elevation. In both cases, the angle is greatly exaggerated for clarity, with the actual angle being less than one degree, compared to the illustrated angle of about ten degrees. The prism is flexed in the appropriate orientation (illustrated with exaggerated flexure) to take the horizontal incoming ray, and deflect it to continue down the optical axis of the scope. This may also be thought of as taking the target aiming point as perceived by the user, and shifting the prism as the rifle moves to keep the same target point at the same position in the field of view. While this occurs, the rifle bore and actual point of impact shift with the unsteady rifle, even though the image appears steady.

Figure 2B:
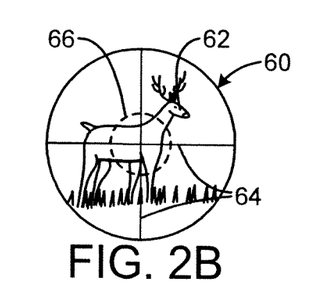
FIGS. 2B, 3B, and 4B are viewfinder images through the scope of FIG. 1.

Feedback is provided to the user about the degree of shaky deviation from the nominal point of aim. FIG. 2B shows the field of view 60 seen by the user. A target 62 is seen, and a first reticle shown as crosshairs 64 that remain fixed in the field of view. The image may be shifted in the field of view in a conventional manner using the knobs 42 to zero and calibrate the scope, and to adjust for elevation and windage based on distance and wind. This shift is independent of the stabilizing shift generated by the prism. In FIG. 2B, the prism is in the neutral position corresponding to FIG. 2A. The intersection of the cross hairs of the first reticle 64 reflects the actual point of impact (assuming a zeroed scope with properly adjusted knobs for the target distance.)

Figure 3B:
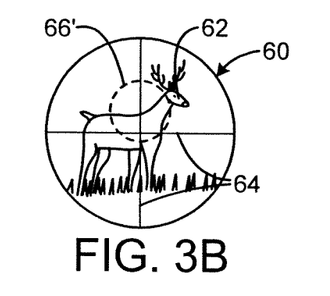

A second reticle 66 in the form of a circle is centered on the first reticle. The second reticle indicates the actual point of aim, and moves as the rifle shakes. The second reticle's movement is in a direction, magnitude, and velocity to correspond to the rifle shake. In FIG. 3B, the upward deviation of the rifle is illustrated by the second reticle circle 66' being shifted upward out of alignment with the first reticle, and in FIG. 4B, the downward deviation of the rifle is illustrated by the second reticle circle 66' being shifted downward out of alignment with the first reticle. The second reticle may shift in any lateral or angular direction based on angular rifle motion in any direction, not just the vertical deviations shown for simplicity in FIGS. 3B and 4B.

The neutral condition shown in FIG. 2B is further indicated by the second reticle 66 being illuminated. The neutral condition is defined as device deflection angles less than a selected threshold, i.e. the size or diameter of the second reticle 66. This threshold may vary depending on the application, and may be varied by user by an input device (not shown) that connects to control circuitry. For maximum accuracy under stable and controlled conditions, the tolerated deviation may be a minute of arc. For closer range hunting in unstable conditions, a much wider range of deviation may be tolerated and still be considered adequately "on target" and thus in the neutral condition to generate the visible feedback. The threshold may be programmed upon manufacturing for a particular application, or may be settable by reprogramming or an input such as a dial or knob in the field by the user. Alternatively, the reticle may be located within the image shifting prism system, so that motion of the prism inherently adjusts the apparent location of the reticle.

Feedback is also provided in the form of a trigger block mechanism to be discussed below in the context of the alternative embodiment. Such a mechanism serves to prevent discharge of the firearm except when the sight accurately reflects the point of impact on the target, so that a user is not deceived by the first reticle being on target when the rifle is shaking off target. A user may apply pressure to the trigger, but it has no effect until the moment that the system indicates a neutral condition, in which case the trigger block releases to allow trigger movement.

To provide feedback, the circuitry that calls upon the prism to shift has an output that transmits a signal, or which is switched to a voltage potential, when the prism deviation is less than the preselected threshold. This enables the user to overcome inherent instabilities without needing to time a shot by anticipating a moment of alignment, which risks jerking the trigger and misaligning the rifle from the target before the bullet exits the muzzle. For instance, a shooter in a stable prone position may still experience a cyclic motion of the point of aim due to breathing. Even with breath control and holding one's breath when taking the shot, heartbeats can cause a cyclical motion. As the user observes the cyclic motion, typically a diagonal or elliptical path of the point of aim, the stabilization system maintains a steady image, and the shooter readily holds the first reticle's 64 crosshairs on the desired target point (which appears steady.) The cyclic or other motion is indicated to the user by the motion of the second reticle 66, which may follow the diagonal or elliptical path. The shooter ensures that the path crosses through the neutral point, so that the circle coincides with the cross hairs periodically, causing the second reticle to illuminate regularly. When such a cycle is established, the shooter may apply pressure to the trigger, and the rifle will discharge when the next neutral condition occurs. This provides for enhanced accuracy, because the shooter does not know when the discharge will occur. Being surprised by the exact moment of discharge prevents and makes impossible the flinching that causes many shots to miss.

A shooter in very unsteady conditions may find that it is difficult to get regular indications of a neutral condition. In such instances, the shooter may adjust the threshold of accuracy, or find a more stable position or support to make shooting more accurate. Thus, the system prevents shots that may be dangerous to bystanders (in the case of a police marksman) or inhumane to game.

The second reticle movement is provided by a transparent LCD display with a sufficient resolution of pixels, so that the circle may be displayed in any location in the field of view. In alternative embodiments, the reticle may be moved by actual motion of the reticle or of an optical element that projects the reticle into the field of view. As shown in FIG. 2A, the first reticle 64 is positioned in the first focal plane of the rifle scope. This is the position at which the objective lens focuses the nearly parallel rays from the image of the distant target. Thus, the reticle 64 appears sharp when the image appears sharp. The element 40 refocuses the rays to the second focal plane, where the second reticle 66 is positioned. This is the focal point of the eyepiece 36, which transmits a sharp image of both reticles and the image to the user 38. In alternative embodiments, the reticles may be switched to occupy the opposite focal planes, or a single reticle having cross hairs, and an LCD or other means for displaying a moving circle may occupy a common focal plane.

Figure 5:
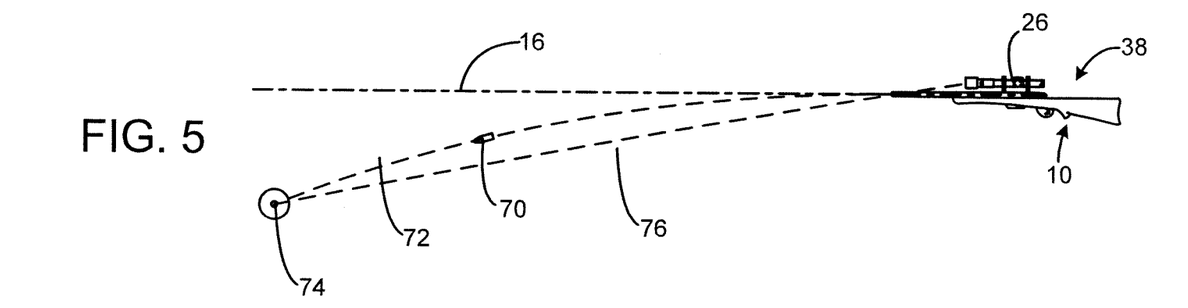
FIG. 5 is a side view of the operation of one embodiment of the invention.

FIG. 5 shows the effects of bullet drop with respect to the rifle 10. The bore axis 16 extends straight from the muzzle of the barrel. In practice, the effects of gravity cause the bullet 70 to drop as it follows the bullet path 72 on approach to the target 74. To provide for accurate aim, the line of sight 76 of the riflescope 26 must be angled downward with respect to the bore axis. This downward angle is different from the slight shift provided by the prism 50 to avoid shake as discussed above, because the downward angle must be sustained. In conventional scopes, this is achieved by adjustment of the lens or prism element 40 using calibrated knobs that are marked with distance (for a given standard ammunition round) or simply the angular deviation in arc-minutes. Such deviations may be on the order of 100 arc minutes for long distance shooting, and thus are about an order of magnitude or more greater than the deviations caused by unsteadiness.

Figure 6:
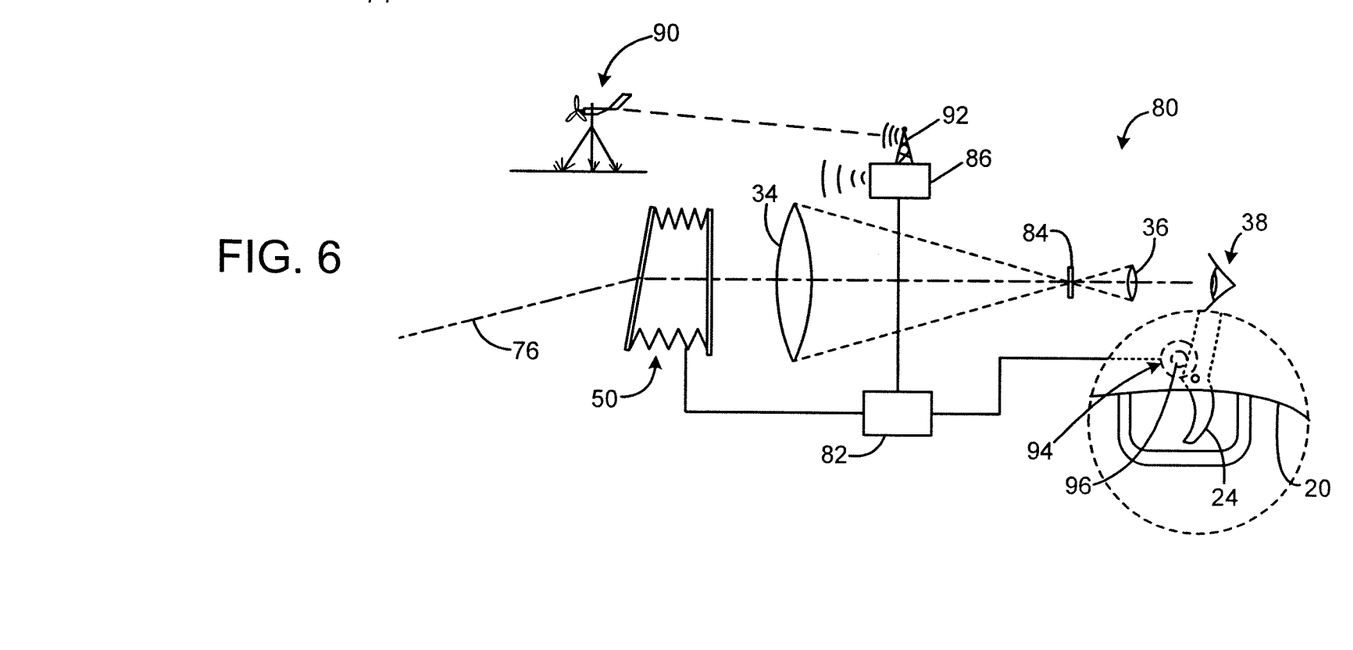
FIG. 6 is a sectional side view of the embodiment of FIG. 5.

In the alternative embodiment shown in FIG. 6, a riflescope aiming system 80 employs the same prism 50, which is connected to control circuitry 82 and positioned forward of the objective lens 34, which is on axis with the eyepiece lens 36. In this embodiment, the element 40 is absent, as are the knobs that adjust it. A single focal plane is provided for a single reticle 84, which is at the common focal point of the objective and eyepiece. All adjustments for windage and elevation are made by the prism 50, which is the only moveable element in the system (other than focusing or collimation adjustments used on any telescope without firearm functionality. These adjustments may be made even if the prism were not employed for shake reduction, and though both features are preferably usefully combined. In a simple case, input knobs (not shown) may be provided for the user to input the target distance or elevation adjustment, as well as any windage correction. However, in the preferred embodiment, either or both of these are established by electronic means.

A rangefinder 86 is connected to the circuitry 82, and determines the distance to the target, and transmits range data to the circuitry, so that the expected bullet drop can be calculated. Based on this bullet drop, the prism shifts by the appropriate amount. Similarly, and optional windage adjustment may be provided by entering wind speed or direction, or employing a remote anemometer 90 that transmits via radio or other means the wind direction and speed. The wind information is received by a radio receiver 92 on the scope, and is electrically connected to the circuitry. The circuitry may have substantial computing power, so that multiple anemometers may be used for more precision.

For more precise calibration, or to adjust to non-standard ammunition or powder loads, the system may be calibrated by shooting at a variety of known distances. At each distance, the user may indicate the deviation from the system's expected target point by inputting to the system the targeted point, and also the actual point of impact, so that the system can detect the difference in angle between the two points, and compensate. This may be done by aligning one reticle with the intended point of aim, and adjusting the other reticle to the actual point of impact. With several distances established, the system's computer circuitry may interpolate a more accurate bullet path for all distances. The system may interface with a separate computer where extensive user input is required, and to avoid an excessively complicated or bulky interface on the scope, and the system and computer may communicate by cable or any wireless means.

In addition, the unit may receive or be entered with more general information about prevailing winds, which would provide less useful information, but would be useful in battlefield conditions where troops are unable to readily ascertain wind information. An advanced system may employ an external system such as airborne doppler radar to more precisely map wind patterns in real time, and to provide downloadable information to a soldier whose system provides a GPS location to upload to the radar system to gain local wind information, including wind patterns between him and the intended target. The system may also employ an elevation transducer that provides information to the circuitry about the angle of elevation or depression of the barrel, so that the image may be shifted to compensate for the effects of shooting at such angles.

FIG. 6 shows in detail a trigger block system that is employed in either illustrated embodiment. A solenoid 94 having a piston 96 is electronically connected to the control circuitry 82 (which is employed by all embodiments.) Normally, the cylinder is extended to block the path of the trigger lever 24 to prevent firing. When the system is in the neutral position, the circuitry applies a voltage, and the piston retracts. Depending on intended usage, when power is lost, the solenoid may be selected to default to the safe position (such as for a hunting rifle) or the enabling position (such as for military use). The trigger block is designed for low friction interaction with the trigger lever (preferably by a trip mechanism employed in triggers and not the sliding piston shown) so that pressure on the trigger lever by a ready shooter does not inhibit retraction of the piston. This enables the shooter to employ the "squeeze when ready" technique, and await the moment of discharge while keeping the crosshairs (or whatever pattern desired for the first reticle) on the target point. In an alternative embodiment, the trigger block may interact with any suitable element in the trigger mechanism to inhibit and permit firing.

In alternative embodiments, firearms employing electronic triggers and using ammunition with electrically activated primers may use the same system, but with the neutral signal enabling the electronic means of firing. For instance, the stabilization system may be added to a riflescope to the rear of the eyepiece, in which case the scope crosshairs would move with rifle and prism movement, and the second reticle would remain stationary. In addition, the system may be employed in conjunction with any aimed weapon, including handguns, bowed weapons, beam weapons, and any military projectile-expelling weapon.

This disclosure is made in terms of preferred and alternative embodiments, and is not intended to be so limited. For instance, the several different features and alternatives may be implemented individually, or any of a wide range of combinations. Some of these options are discussed below.

The image stabilization technology discussed above with respect to the preferred embodiment may be substituted for by other optics, magnetic stabilization or mechanical isolation of the optics from the housing and still work. The system may be integrated in new product designs, or retrofitted to existing scopes and rifles. The feedback transducer reticle may be a painted or etched circle, crosshairs or other reticle design on a flat glass ahead of the stabilizing system in add-on configurations on the front of the scope or to the rear of the stabilizing system in add-on configurations to the rear of the scope. The trigger block can receive the signal by wire or wireless (using the keyless systems from the car industry or similar systems). For versions incorporating bullet drop and windage correction, the operation of the stabilizing system never changes. Instead, the location of the neutral or zero correction point is changed in the sensing system so that the signal is sent when the elevation is such that bullet drop is compensated for.

The preferred embodiment shows and describes an internal trigger block. For many applications, it will instead be desirable to have an add-on external trigger block that requires no modification of the firearm, just as an add-on stabilizer requires no modification of the telescopic sight. The blocking mechanism would attach to the bottom of the trigger guard behind the trigger. It would be installed to touch the back of the trigger lever and secured with set screws (or other means). It would prevent the trigger from traveling backwards until the zero adjustment signal is receiver at which time it releases. Pressure is applied to the trigger by the shooter when his sight pattern is the way he wants it. He moves the weapon to align the moving reticle with the stabilized one and when he accomplishes this the signal is given, the block releases and the weapon fires. A second part of the block remains in front of the trigger and resets the block when the trigger is released and returned to "ready" position. With an external block system there would be no need for adjustment for different firing systems.

All reticle adjustment directions are given as examples, and may be reversed depending on common practices and simplicity.

An exemplary stabilizing system would be the Canon Vari-Angle Prism system packaged with controller and battery in a short, wide tubular barrel with front and rear non-magnifying lens. An additional circuit would detect the instances in which there is no correction by the stabilizing optics and be capable of sending out an electrical signal. A battery condition indicator and an on/off switch would complete the standard package.

This package would attach to the front of the barrel of the telescopic sight. The attachment would use an adapter selected to fit the type of attachment (front or rear) and the size of the front of the telescopic sight. The front of the adapters will accept the standard screw-in component of the stabilizing package.

One type of adapter would slip over the barrel and be moved rearward until the rear non-magnifying lens was in contact with the front lens of the sight. It would then be tightened at the rear with a long section that would hold the alignment of the stabilizer and sight. Another type of attachment would unscrew the front shading lens and replace it with a screw-in adapter chosen to fit the barrel. An internal receptor will allow the shading lens to be reattached inside the barrel of the stabilizer if that is desirable.

A reticle (circle, crosshairs, dot, or other design) would be etched in front of the stabilizing optics to provide the feedback of the weapon position in relation to the stabilized image. This reticle would be lighted from below with a small bulb that would shine when the "zero correction" signal is received.

Another version would incorporate a range finder (optical or laser) in the stabilizer package. The optical range finder would be connected to the stabilizer controller to communicate the range. The communication of the range would cause the controller to send a "zero correction" signal at a higher aiming point than the neutral point to compensate for bullet drop at that range. The feedback reticle would be adjusted down to indicate that new "zero correction" signal position. This would require the shooter to raise his weapon to bring the feedback reticle in line with cross-hairs and consequently compensate for the bullet drop at the range shown by the range finder.

A calibration of this range input to the controller would cause the range detected to move the signal point to the appropriate setting that offsets the bullet drop. It would be done in a "calibration mode". In this mode, a target is set up at a normal range for the usage expected. The target is acquired with the stabilizer in operation. The range is detected by the range finder; the bullet is fired and the bullet drop at this distance from the target is noted. The calibration knob (or other method such as ring, button, etc.) is operated to lower the feedback indicator circle so that the center of the circle is even with the bullet strike. Now the range is known and the amount of bullet drop at that range is known, and they are unique to that weapon/ammunition combination. Each time the range is detected by the range finder those values are used to determine the change in the position of the "zero adjustment" signal that will just allow for that bullet drop.

As a practical matter the calibration of the bullet drop adjustment would work best with more than a neutral setting of the telescopic sight range. This feature could be used in conjunction with different telescopic sight settings. By having a selector on the stabilizer the weapon could be calibrated at 100 yds, 400 yds and 600 yds, for example, and the range selected in the field would have exact range settings through the disclosed system. Each ratio used to adjust for bullet drop would correct at the telescopic sight setting for exact point of impact information. In the prior art, with high magnification, the movement of the sight reticle from shooter body instability was greater than the gross adjustment of the range. Now with stabilized optics, the precise adjustment of range is useful, and the disclosed system delivers it.

The amount of bullet drop for a particular weapon/ammo combination is due to the force of gravity and factors of velocity and bullet drag. The windage used in sighting is an adjustment for the force of the wind. Once the ratio of range/bullet drop for one force (gravity) is known, the ratio of bullet deflection for another force (wind) can be automatically adjusted for. The force of gravity was allowed for by a ratio of bullet drop distance to range distance. All that is needed now is to detect the force of the wind vector that is perpendicular (other vectors are not important) to the line of sight. By applying a constant relating wind force amount to gravity force the adjustment for wind is available.

A tube (or tubes), perpendicular to the axis of the sight, which detects the direction and velocity of the crosswind vector provides the information needed for an indicator for manual adjustment or automatic adjustment based on the range and weapon/ammo combination. A single tube with a two way turbine that detects speed and direction fill this requirement. Another simpler design would consist of two opposite facing venturis with pressure detectors.

Gravity is the same all the way to the target but wind is not necessarily the same all the way to the target. This information could be displayed as an indication to be used as the basis of manual windage adjustment. The shooter selects windage adjustment with that indication as his basis and his estimates of wind differences between him and the target (e.g. shooting across a valley). His adjustment can be made in the stabilizer package or in the windage adjustment on the telescopic sight.

This package that attaches to the front of the rifle scope may be a stand alone product with several additional attributes available. The "zero correction" signal in the basic single component package is visual. The main advantages are the additional visual details available with the stabilized image and a more accurate shot.

Hyper accuracy at high magnification or with unstable platforms (e.g. pistols or archery versions) is available to the shooter with the trigger block mechanism added for these additional applications.

For the add-on system, a small, low power, high frequency, radio transmitter that transmits an encoded signal when the "zero correction" situation is detected is added to the device that attaches to the front of the telescopic sight. A small battery-powered receiver, tuned to this encoded signal, is packaged with a simple release mechanism that is coupled to a trigger block device. That device is attached to the trigger guard with the "blocking tang" behind the trigger. It slides forward along the guard until it contacts the trigger. When contact is made the trigger block is fastened in place. The trigger is now blocked from operation until two things happen: the shooter applies pressure on the trigger and the encoded signal indicating "zero correction" condition is received by the blocking mechanism.

The shooter applies pressure on the trigger when the sight picture is as he wants it and moves the weapon so the feedback reticle and the telescopic sight reticle coincide. This situation causes the transmitter to broadcast an encoded signal (similar to the system in an automobile keyless entry system). The encoded signal prevents different systems from interacting in the same way a keyless entry system only opens its door and not all those within range. When the encoded signal is received by the trigger block mechanism the block is released and the pressure by the shooter fires the weapon. Since the shooter does not know when the release is coming there is no trigger jerk and accuracy is even higher than with the single add-on component. There is only a receiver and a release mechanism so its power requirement is low.

Besides the trigger block tang that sticks up from the trigger guard behind the trigger there is another tang that is lying flat against the trigger guard in front of the trigger. When the trigger mechanism is released and the blocking tang is pushed to lie flat against the trigger guard under the engaged trigger the reset tang is moved perpendicular to the trigger guard in front of the trigger (now at the rear). This "reset tang" engages the trigger as it returns to firing position and resets the blocking mechanism. Now the reset tang is lying along the guard and the block tang is locked against the rear of the trigger, ready for another target.

One very useful application of the system would be the addition of the stabilizing package to an archery mechanical string pull device. A low power sight with stabilizing, ranging and windage capabilities would have an even greater impact on the accuracy in archery. The effects of the two forces (gravity and wind) are even greater on an arrow than on a bullet. The trigger release could be wired to directly receive the "zero correction" signal to release the mechanical string pull's trigger.

This arrangement also allows the sight to be positioned with the eyepiece at the shooters aiming eye, also improving accuracy. Optics can connect the eye with the arrow line of sight even though the line of sight is inches below the eyepiece level. Ranging, windage, jerk-free release and comfortable sight position would provide significant advantages for an archery application. Similar advantages can be achieved with scoped pistols.

Methods of Operation

Although aspects of the invention have been explained in the foregoing descriptions with respect to certain apparatus and physical embodiments, further elaboration as to the operational methods employed will assist those of ordinary skill in the art in practicing the invention.

Specifically, a method is provided for stabilizing an image through an optical scope and compensating for movement of a weapon directing a projectile along a line of sight, comprising: providing an image stabilization device for an optical scope mounted on a weapon, wherein the image stabilization device includes a sensor to detect motion of the weapon; providing a trigger release device operatively connected to a trigger on the weapon; detecting movement of the weapon by the sensor; generating an output signal from the sensor, wherein the output signal corresponds to the position and velocity of the weapon in a plane perpendicular to the line of sight; processing the output signal to determine an optimal release period, and then generating a release signal during the release period; and using the release signal to activate the trigger release.

In a preferred embodiment, the release period is determined based upon an accuracy selection predetermined by a user.

In a further embodiment, the method further comprises providing a trigger pull detection device adapted to determine if the trigger has been pulled by a user; and using the release signal to activate the trigger release only if the trigger pull detection device indicates that the trigger has been pulled.

Optionally, the method may further comprise determining the range of a target, and adjusting the optical scope for the determined range and ballistics characteristics of the projectile. Preferably, the optical scope is adjusted electronically by a rangefinder in communication with the image stabilization device.

Also, the method may further comprise determining the degree of wind between the weapon and the target, and adjusting the optical scope for the determined wind and ballistics characteristics of the projectile. Preferably, the optical scope is adjusted for wind electronically and in communication with the image stabilization device.

As will be further evident from a consideration of FIGS. 7-18, the position of the stabilizing lens exactly defines the position of the device with respect to the image. When the stabilized image is on the target, the position of the stabilizing lens exactly defines the position of the barrel with respect to the target. The image stabilizing system and trigger block restrict firing until the data defining lens position indicates that the barrel position (with respect to the target) is correct. At that point the restriction is released and the weapon fires with greater accuracy than without the compensation. To summarize, the trigger is not pulled by the shooter until the stabilized image is on the target, although many release signals are sent as image data is processed. The only signal that matters is the one sent immediately after the trigger has been pulled by the shooter. The next firing release signal received after the trigger pull allows the trigger to fire the weapon.

Figure 7:
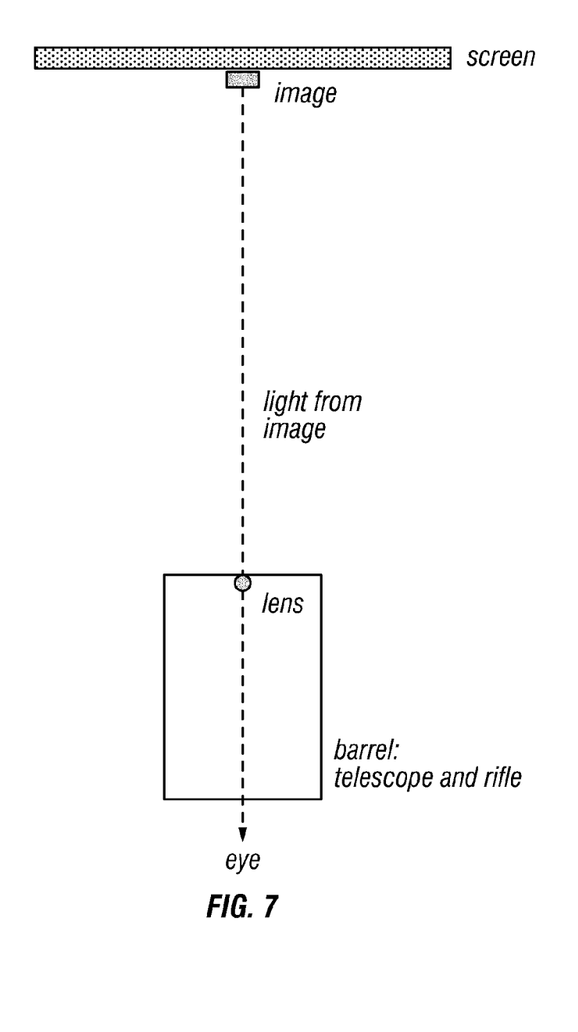
FIG. 7 is a schematic view of an idealized and stable lens focused on a target.

The gyroscopic instruments within the image stabilization system send position data to the microprocessor. The processor positions the stabilizing lens accordingly. The lens is positioned to refract the image to compensate for the barrel movement detected by the gyros so that the image is held steady for the eye. Stabilizing lens movement is the analog of barrel movement. Therefore, when the stabilized sight is on target, displacement of the lens from the zero X, zero Y position is the displacement of the barrel from the target, as shown in FIG. 7 in terms of the line of sight, and in FIG. 10 with respect to the image through the scope. Detecting the position of the stabilizing lens can be done more than one way. The most direct would be to read the position instructions to the lens. Another way is to read positions from gradient reticules on the lens sides as suggested in FIG. 10. By sampling these positions at a known rate, the processor tracks the barrel vector with respect to the target. The vector of each change is calculated and extrapolated by the bullet time of flight (from the ballistics data). The ballistics algorithm calculates the point of impact taking into account the momentum imparted by the barrel.

When this point of impact falls within the acceptable range of values, a release signal is sent to the firing restrictor (or trigger block). As explained previously, although many signals are sent, if the trigger is not pulled against the restrictor, there is no shot. The shooter pulls the trigger when the stabilized image is on target, and the next release signal after trigger pull releases the restriction, and the weapon fires. The barrel movement vector, determined by the stabilizing lens vector, imparts the momentum to the bullet that will carry it to the calculated point of impact, e.g. the target, during the time of flight (TOF) of the bullet.

Figure 8:
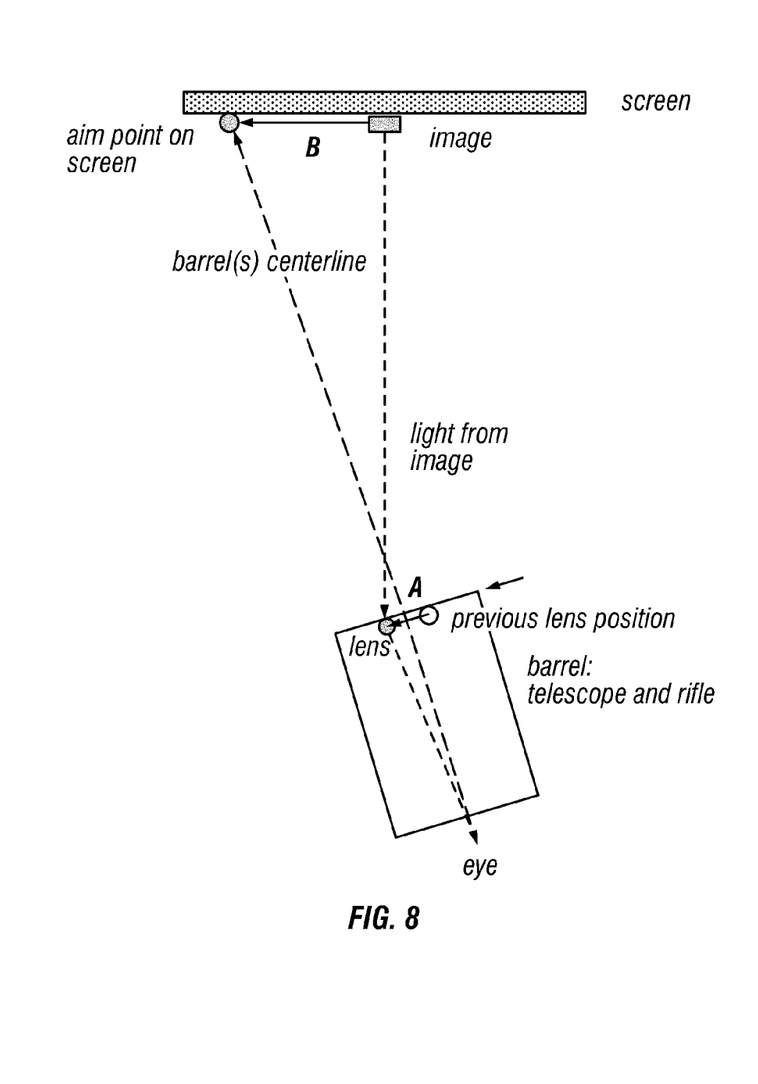
FIG. 8 is a schematic view of a lens in motion to the left and attempting to center on a target.
Figure 9:
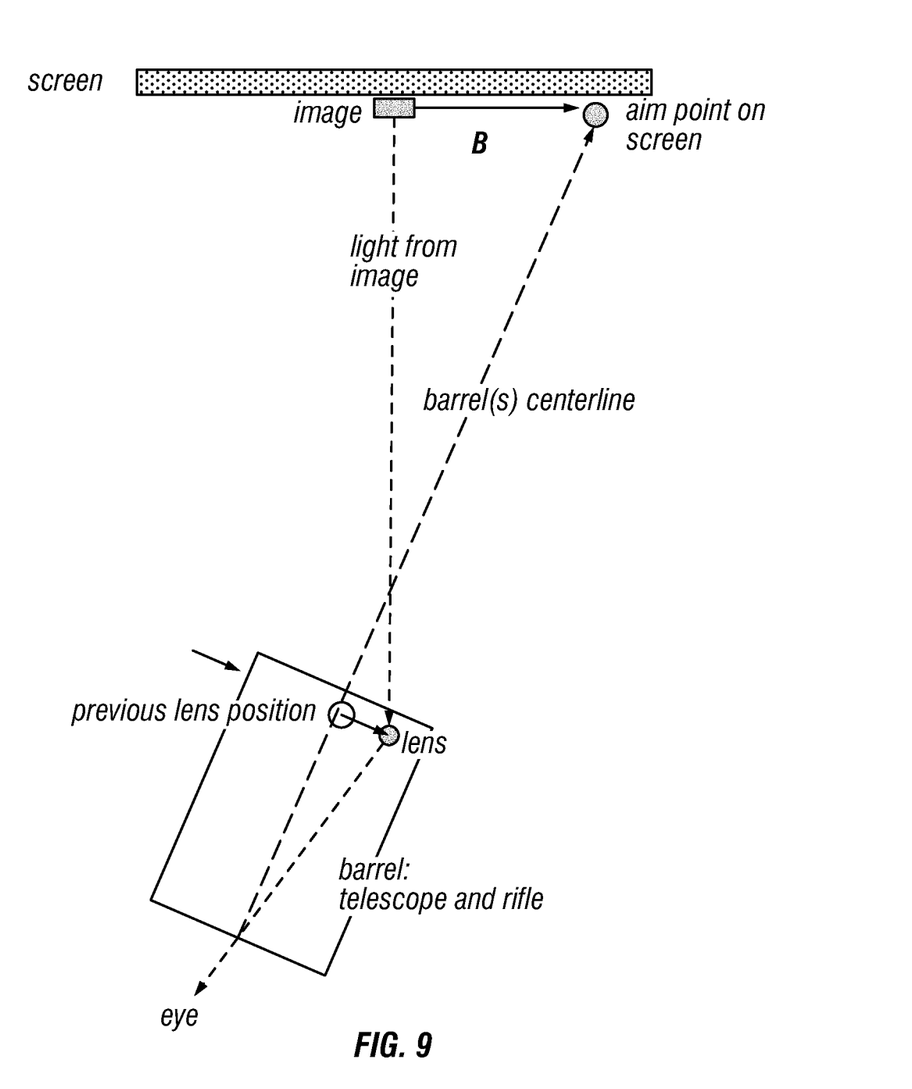
FIG. 9 is a schematic view of a lens in motion to the right and attempting to center on a target.

FIGS. 8 and 9 depict schematic views of a lens in motion to the left and right, respectively, by operation of the image stabilization device. As those figures indicate, deviations in the lens position from the line of sight to the target are proportional to the deviation of the barrel. In stabilizing the image, the lens moves to redirect the eye as the barrel moves. So, the barrel is centered on the target when the lens is centered. Thus, the output signal from the image stabilization device is ideal in efforts to center the point of impact on the target.

Figure 10:
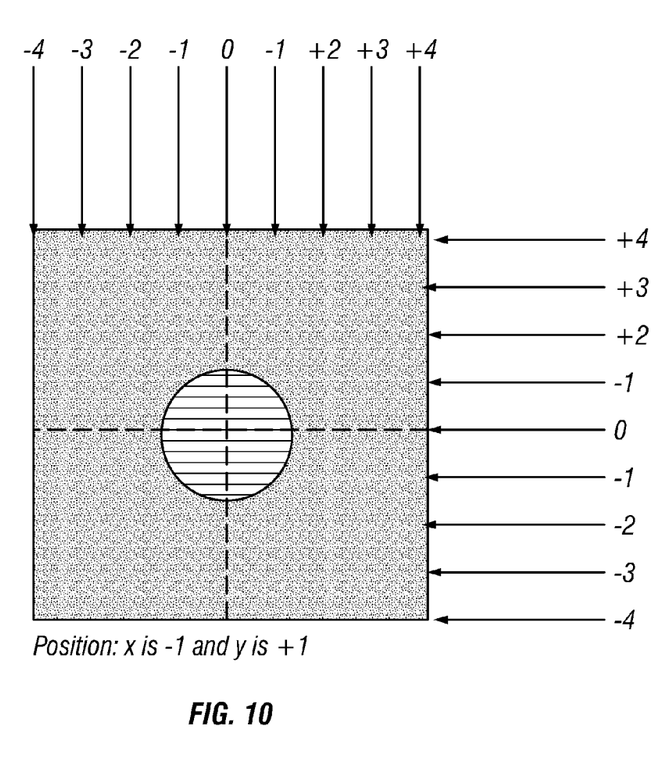
FIG. 10 is a schematic view of a lens position centered on a target.
Figure 11:
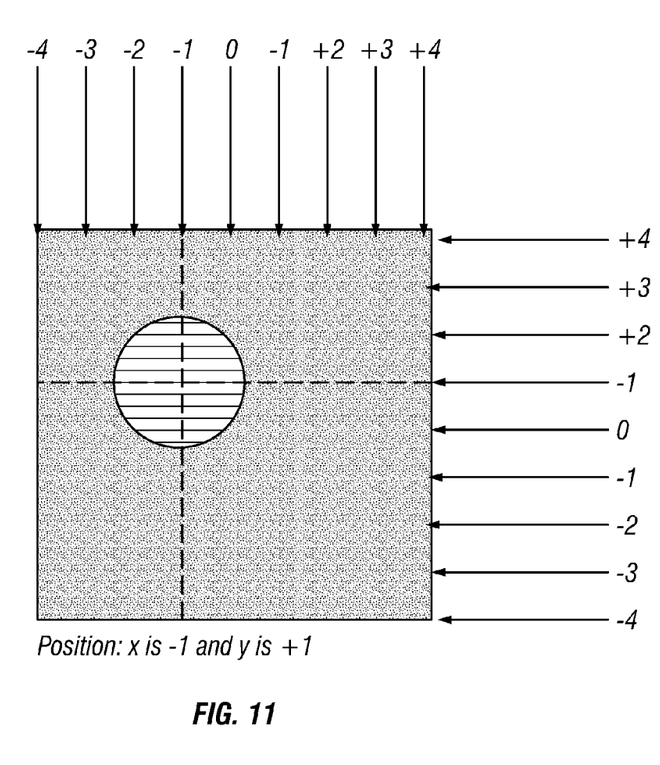
FIG. 11 is a schematic view of the lens of FIG. 4 moving to a new position to compensate for movement of the firearm.

As suggested above, FIG. 10 depicts a schematic diagram of a stabilization lens in its carrier. The numbered lines indicate units of deviation of the lens from a centered position, and FIG. 10 shows a lens centered at X=0 and Y=0. In FIG. 11, as a result of a hypothetical barrel movement, the lens has moved to redirect light from the stabilized image in response to movement of the barrel, which is positioned at X=−1 and Y=+1. Similarly, in FIG. 12, movement of the barrel has caused the lens to move to redirect light from the stabilized image to a new position at X=+2 and Y=−2. FIG. 13 depicts an image in which the stabilized lens and the aimpoint are centered, such that the lens position is at X=0 and Y=0, and the aimpoint is centered on the bullseye of the target.

Figure 12:
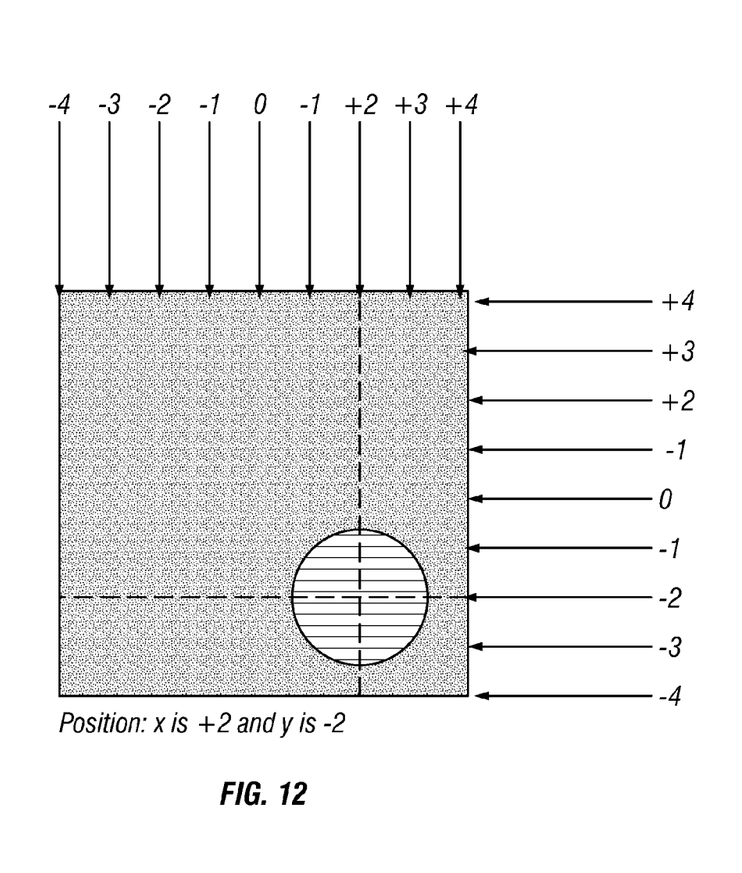
FIG. 12 is a schematic view of the lens of FIG. 4 moving to another position to compensate for further movement of the firearm.
Figure 13:
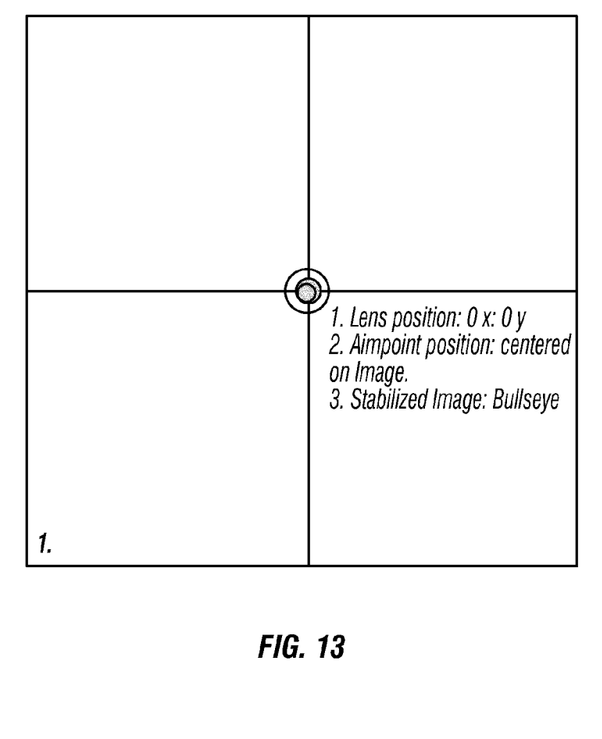
FIG. 13 is a schematic diagram showing the relative positions of a target, the lens, and the point of aim when no firearm movement is present.
Figure 14:
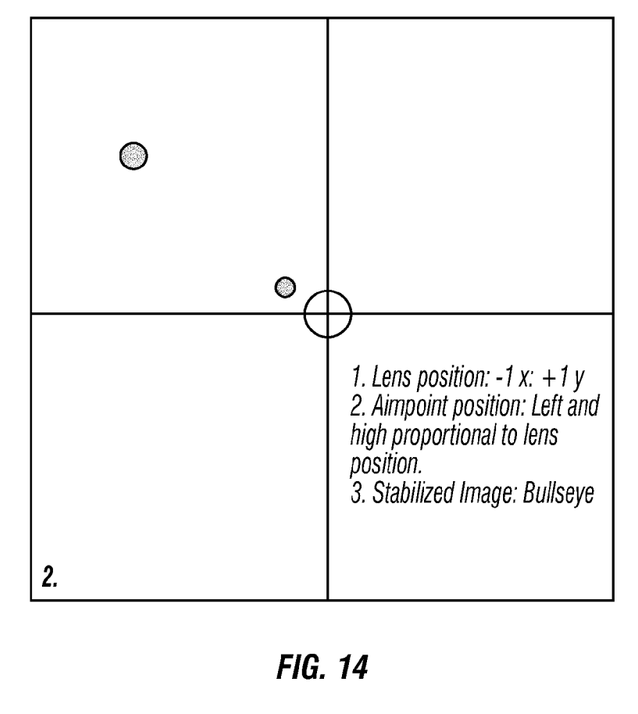
FIG. 14 is a schematic diagram showing the relative positions of a target, the lens, and the point of aim when the firearm is in a first motion.
Figure 15:
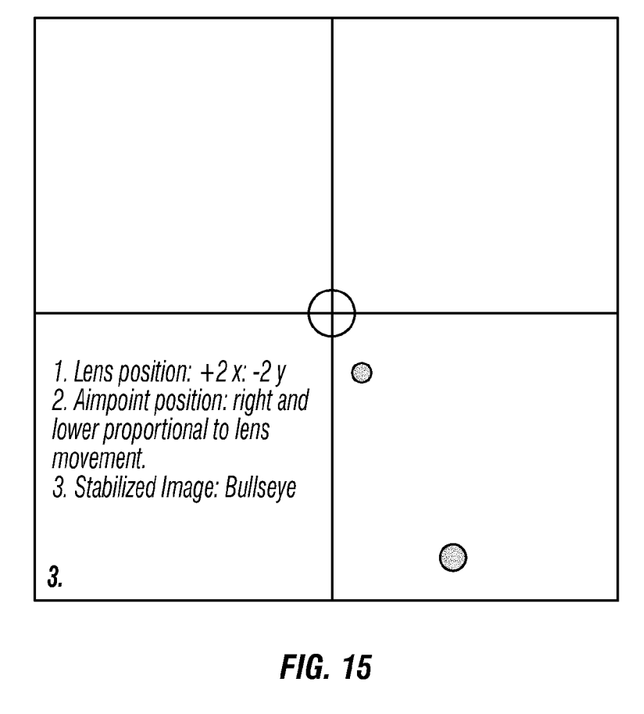
FIG. 15 is a schematic diagram showing the relative positions of a target, the lens, and the point of aim when the firearm is in a second motion.

FIG. 14 and FIG. 15 depict images which correspond to the lens positions shown in FIG. 11 and FIG. 12, respectively. Thus, it can be seen that the actual location of the aimpoint and lens positions are different, they are in fact proportional as described above.

Figure 16:
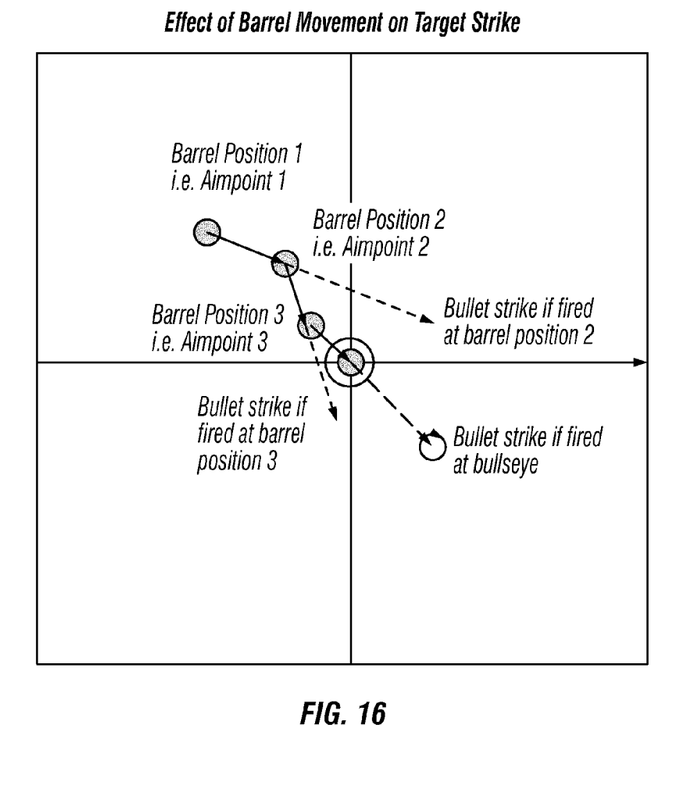
FIG. 16 is a schematic diagram showing the effect of firing when the moving firearm approaches the target, and the effect of firing when the moving firearm is aligned with the target.

FIG. 16 depicts a composite image of the position of the aimpoint in three positions prior to release of the trigger, and showing possible points of impact. As the barrel moves due to the conditions described previously herein, the aimpoint will also move, such as in Positions 1, 2, and 3. Understandably, if the weapon is fired when the aimpoint is on the target, while the barrel is in motion, then the bullet will not impact the bullseye, because it will travel to a location which is dictated by the momentum imparted to the bullet when it leaves the muzzle. Therefore, the critical aspect of the present invention is to define a time, or release period, wherein the trigger block or firing restrictor is released while the barrel is moving along a path that will cross the bullseye. The exact time of release will depend on several factors, but most importantly the TOF to the target. In FIG. 16, the position of the aimpoint at Position 3 is an example of an ideal time to activate the trigger release, because the bullet will strike the bullseye, or at least in the near vicinity more accurately than the shooter relying solely on his own instincts.

Figure 17:
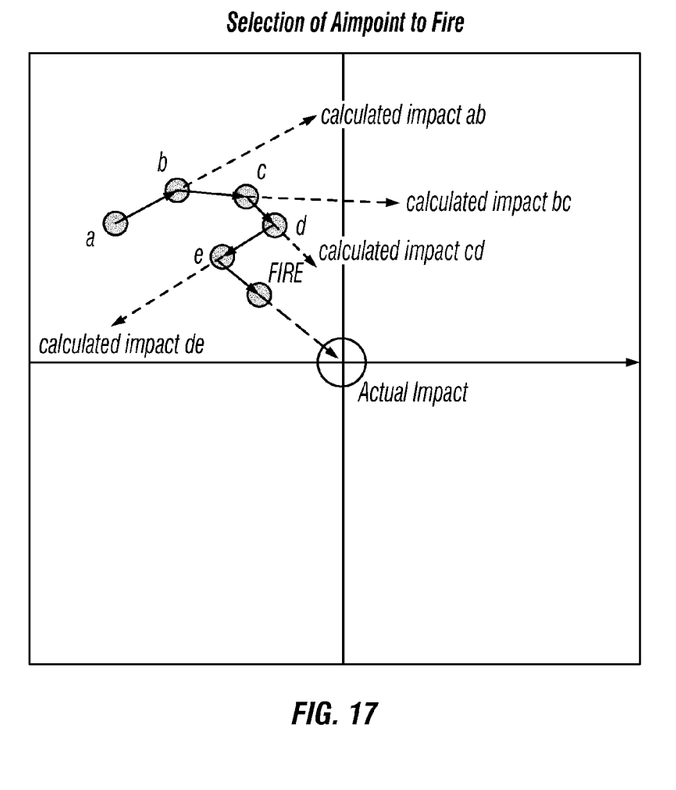
FIG. 17 is a schematic diagram showing a series of firearm motions which are taken into consideration before indicating a trigger release.

FIG. 17 is another depiction of barrel movement in several positions and the possible points of impact if the weapon is fired in each case. Again, barrel movement is tracked by the stabilization lens position. The present invention calculates the barrel position to fire such that the bullet will impact the center of the target at the end of its TOF. In practice, as the shooter aims the weapon, the trigger is pulled by the shooter against the trigger block which prevents firing. Only at the instant that the calculation of the lens movement determines a proper position, path, and velocity of the barrel is the trigger block released. Upon release of the trigger, the weapon is allowed to fire the bullet, resulting in a point of impact that is far more accurate than other methods.

Figure 18:
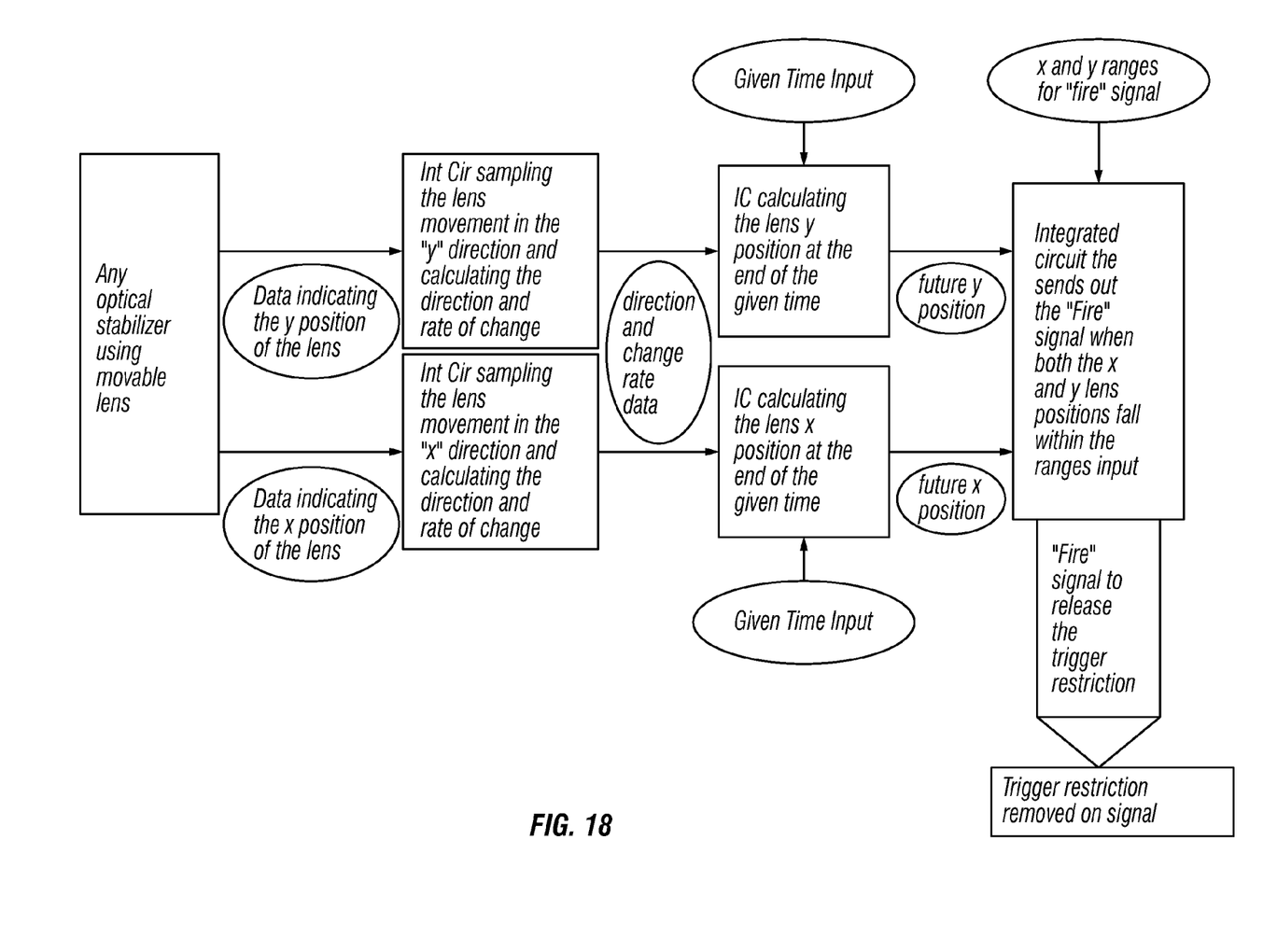
FIG. 18 is a flowchart depicting the sequence of events prior to activation of the trigger release signal.

Finally, FIG. 18 depicts a typical flowchart showing the sequence of events prior to activation of the trigger release signal. As explained previously, any image stabilization device which is capable of outputting an electronic signal may be used in connection with the methods described, because the movement compensation for the weapon is directly proportional to the movement of the stabilizing lens. The present invention employs that information, in combination with known ballistics of the specific projectile, range, windage, and weapon characteristics to determine the timing of a release period for the trigger release operating on a trigger block.

In practice, a small thin film pressure switch may be attached to the stock. When stabilization and compensation are required, the thumb of the shooter moves to cover the switch and begin operation. After the shot (or shots) the thumb slides down, turning off the operation and conserving battery power. Signal input control is necessary because many release signals are being sent even when the trigger is not pulled, as explained elsewhere herein. If input is not controlled, the relays would be opening and closing constantly while the system is on. Such operation would undesirably use battery power unnecessarily, and would present a small but annoying clicking sound to the shooter. A pressure switch prevents the release signal from getting through to the trigger restrictor until the trigger is pulled. Only the next release signal arriving after trigger pull operates the release relay to conserve power and eliminate clicking.

Therefore, to summarize the fundamental operations of the invention in accordance with the methods described herein, the shooter first finds the desired target in the normal manner by placing the target generally within the view of the scope, placing the reticle on the desired location of the target. During this first step, the image stabilization system would be turned off. In one embodiment, the range to the target is entered into the stabilization system manually and the scope is adjusted for range and windage. In another embodiment, such adjustments can be made automatically and electronically. The rate of fire parameter within the system is set for the situation desired. When the general location is determined, the shooter's thumb moves to the on-off switch to turn on the stabilization system.

The invention then stabilizes the image, allowing for quick and accurate identification of the target. Immediate acquisition of the target in the stabilized image brings quick pressure to the trigger. An instant later, the release signal is transmitted if the compensation system determines that the X-component and Y-component of the movement are within the predefined ranges. Upon transmission of the release signal, the shot is fired accurately. If the automatic ranging (bullet drop compensation) and windage correction features are included, the shooter enters the range and wind force manually and makes no other adjustments. The necessary corrections are then made within the circuitry to compensate for the bullet drop of the particular ammunition at this range. Similarly, entering the wind vector in terms of percentage of gravity automatically moves the reticle left or right to compensate for windage. These features, coupled with a rangefinder/wind gauge would serve to automate such adjustments.

Further Applications

One possible application of the present invention is to weapons with a reflex sight such as a holographic sight or red dot sight. These sights project an aiming reticle at infinity for quick reflex shooting, usually using both eyes to aim. They are built with zero magnification, because they are usually used for close range shooting. They may be used with magnifying units available with a swing mount behind the reflex sight. The magnifier can be swung into play when needed and out of the way when the conditions change. This allows the shooter to choose 2+ or 3+ magnification for longer ranges. The magnifier can be stabilized identically to the telescopic sight. One of its lenses could be mounted in a module that moved to counter weapon movement so the image would stay centered and still. It would be much easier to identify, acquire and then designate the target with a trigger pull, and the accuracy would be greatly enhanced by the present invention.

For example, in a typical field operation, a military patrol may be in a small town to evaluate insurgent status. They run into a fire fight at close range and engage with reflex red dot sights with zero magnification. The enemy withdraws and takes up positions 100 to 200 meters from the original engagement. Their positions are in civilian houses and behind civilian walls and doorways. Optionally, the patrol could switch to automatic fire and put 20 to 30 rounds on each position with maybe a third of these effective, but with great damage and danger to civilians and ammunition usage. Alternatively, they could advance to reflex sight range, but with greater danger. With the weapon equipped with movement compensation devices employing the present invention, the troopers swing their stabilized multipliers into position behind the reflex sights and begin very accurate return fire. With every shot getting on target, they quickly neutralize the target from a safer range, with much less ammunition, and less civilian damage. They are able to engage sooner, because their rangefinders adjusted for bullet drop automatically. With the stable image, there was no mistaking combatants from citizens, and the greater accuracy of the semi-automatic fire used very much less ammunition.

Also, the greatest training expense for field troops is marksmanship. The results of this expensive training is dismal in actual combat. The present invention would make all troops equally accurate at longer combat ranges, dramatically cut training time and expense, and the training would carry over to combat.

With respect to law enforcement, the benefits are more pronounced than the military. Target identification with a stablized sight picture becomes critical when civilians and other officers are involved. Controlled placement of the shot in field conditions is available in hostage situations. Turning a reflex-aimed pistol into a longer range telescopic sight weapon as the situation warrants is another benefit that fits well with law enforcement needs.

These same benefits accrue similarly to the hunter in the field with quick, accurate identification and acquisition, exact placement of the shot for a quick, clean kill, and bench rest accuracy in field conditions. Firearms equipped with device incorporating the present invention would extend their safe range as the stabilized image allows for exact target identification and precise shot placement.

Finally, optical stabilization, applied to a bow sight and the sport of archery would revolutionize the field. The bow is even less steady than a rifle or pistol, and there is no archery bench rest. When the target is acquired, the string release device well known to archers is squeezed, just as the trigger in a firearm. Keeping the target centered in the stabilized image will insure a hit, because the arrow/bow ballistics will release the arrow when the position and movement are optimal. Again, the arrow will not be released unless the string release device has been squeezed and the release signal has been sent by the system.

What is claimed is:

1. A method for stabilizing an image through an optical scope and compensating for movement of a weapon directing a projectile along a line of sight, comprising:

providing an image stabilization device for an optical scope mounted on a weapon, wherein the optical scope includes a telescopic sight reticle, and wherein the image stabilization device includes a feedback reticle and a sensor to detect motion of the weapon;

providing a trigger release device operatively connected to a trigger on the weapon;

detecting movement of the weapon by the sensor;

generating an output signal from the sensor, wherein the output signal corresponds to the position and velocity of the weapon in a plane perpendicular to the line of sight upon alignment of the feedback reticle with the telescopic sight reticle;

processing the output signal to determine an optimal release period, and then generating a release signal during the release period; and using the release signal to activate the trigger release.

2. The method of claim 1, wherein the release period is determined based upon an accuracy selection predetermined by a user.

3. The method of claim 1, further comprising:

providing a trigger pull detection device adapted to determine if the trigger has been pulled by a user; and using the release signal to activate the trigger release only if the trigger pull detection device indicates that the trigger has been pulled.

4. The method of claim 1, further comprising the step of determining the range of a target, and adjusting the optical scope for the determined range and ballistics characteristics of the projectile.

5. The method of claim 4, wherein the optical scope is adjusted electronically by a rangefinder in communication with the image stabilization device.

6. The method of claim 1, further comprising the step of determining the degree of wind between the weapon and the target, and adjusting the optical scope for the determined wind and ballistics characteristics of the projectile.

7. The method of claim 6, wherein the optical scope is adjusted for wind electronically and in communication with the image stabilization device.

* * * * *